(12) United States Patent
Lyons et al.

(10) Patent No.: US 10,044,304 B2
(45) Date of Patent: *Aug. 7, 2018

(54) METHOD AND APPARATUS FOR CONTROLLING A TURBOGENERATOR SYSTEM

(71) Applicant: Bowman Power Group Limited, Southampton (GB)

(72) Inventors: John Lyons, Southamptom (GB); Stephen Cusworth, Southamptom (GB); Jonathon McGuire, Southamptom (GB); Shinri Szymko, Southamptom (GB); Toby King, Southamptom (GB)

(73) Assignee: Bowman Power Group Limited, Southampton (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,199

(22) Filed: Nov. 9, 2017

(65) Prior Publication Data

US 2018/0069497 A1    Mar. 8, 2018

Related U.S. Application Data

(63) Continuation of application No. 14/653,561, filed as application No. PCT/GB2013/053342 on Dec. 18, 2013, now Pat. No. 9,831,811.

(30) Foreign Application Priority Data

Dec. 20, 2012 (GB) .................................. 1223065.2

(51) Int. Cl.
*F02D 29/06* (2006.01)
*H02P 9/04* (2006.01)
(Continued)

(52) U.S. Cl.
CPC ................ *H02P 9/006* (2013.01); *H02P 9/08* (2013.01); *H02P 9/10* (2013.01); *H02P 9/102* (2013.01)

(58) Field of Classification Search
CPC ...................................................... F03D 7/0248
(Continued)

(56) References Cited

U.S. PATENT DOCUMENTS 3,141,096 A    7/1964  Singelmann
5,907,192 A    5/1999  Lyons et al.
(Continued)

FOREIGN PATENT DOCUMENTS

DE    102006051342 A1    5/2008
EP         2492458 A1    10/2010
(Continued)

OTHER PUBLICATIONS

International Search Report and Written Opinion received in counterpart PCT Application PCT/GB2013/053342 dated Apr. 30, 2015, 9 pgs.
(Continued)

*Primary Examiner* — Tulsidas C Patel
*Assistant Examiner* — Thomas Quigley
(74) *Attorney, Agent, or Firm* — Shumaker & Sieffert, P.A.

(57) ABSTRACT

An apparatus for controlling a turbogenerator system when a power electronics circuit of the turbogenerator system is unable to provide a sufficient load on the turbogenerator to prevent the turbogenerator from accelerating uncontrollably is described. The apparatus comprises a monitor including a first sensing device operable to detect a condition of the turbogenerator, and a brake controller responsive to a turbogenerator detection output from the first sensing device to issue a first brake control signal for operating a brake circuit
(Continued)

Turbo Generator Power Electronics Block Diagram to prevent the turbogenerator from accelerating uncontrollably and a second brake control signal for operating the brake circuit to permit resumption of normal operation of the turbogenerator.

14 Claims, 8 Drawing Sheets

(51) Int. Cl.
*H02P 9/00* (2006.01)
*H02P 9/10* (2006.01)
*H02P 9/08* (2006.01)

(58) Field of Classification Search
USPC .............................. 290/40 B, 43, 44, 54, 55
See application file for complete search history.

(56) References Cited

U.S. PATENT DOCUMENTS

| | | | |
|---|---|---|---|
| 6,093,975 A | 7/2000 | Peticolas | |
| 6,265,785 B1 | 7/2001 | Cousineau et al. | |
| 6,274,945 B1 | 8/2001 | Gilbreth et al. | |
| 6,784,566 B2 | 8/2004 | Thomas | |
| 8,624,414 B2 | 1/2014 | Bennauer et al. | |
| 2010/0089056 A1 | 4/2010 | Cooper et al. | |
| 2010/0123314 A1 | 5/2010 | Menke | |
| 2010/0154414 A1 | 6/2010 | Schwarzenthal et al. | |
| 2011/0210551 A1 | 9/2011 | Scholte-wassink | |

FOREIGN PATENT DOCUMENTS

| | | |
|---|---|---|
| EP | 2372127 A1 | 10/2011 |
| EP | 2423464 A1 | 2/2012 |
| JP | 59-14172 S | 8/1984 |
| JP | 2008118807 A | 5/2008 |
| WO | 2007109048 A2 | 9/2007 |

OTHER PUBLICATIONS

Search Report under Section 17 received in counterpart GB Application No. GB1223065.2 dated Apr. 27, 2013, 1 pg.
International Preliminary Report on Patentability dated Jun. 25, 2015 in counterpart International Application No. PCT/GB2013/053277, 7 pgs.
Prosecution History of U.S. Appl. No. 14/653,561 dated Nov. 3, 2015-Oct. 25, 2017, 52 pps.

METHOD AND APPARATUS FOR CONTROLLING A TURBOGENERATOR SYSTEM

This application is a continuation of U.S. application Ser. No. 14/653,561 filed Jun. 18, 2015 which is a national stage entry under 35 U.S.C. § 371 of International Application No. PCT/GB2013/053342, filed Dec. 18, 2013, which claims priority to G.B. Application 1223065.2, filed Dec. 20, 2012. The entire contents of U.S. application Ser. No. 14/653,561, International Application No. PCT/GB2013/053342 and G.B. Application 1223065.2 are incorporated herein by reference.

TECHNICAL FIELD

The present invention concerns a method and apparatus for controlling a turbogenerator system. Some embodiments of the present invention relate more particularly to controlling a turbogenerator system during disturbances of the local electrical grid network.

BACKGROUND

In normal operation, the speed of the turbogenerator in such a system is controlled by exporting power to the local electricity grid. If the turbogenerator speed begins to increase then the output power is increased to slow the turbogenerator down. By this means, the turbogenerator is held at a constant speed. However, in the event of a grid disturbance or outage, the turbogenerator would accelerate uncontrollably, in the absence of any additional controls.

As is well known, the electrical grid is affected by disturbances, which may last from a few micro-seconds to periods of downtime or outage lasting for seconds, minutes or even hours. Most countries have national or state regulations, which require generators to disconnect from the electrical grid if the grid voltage or frequency falls outside certain limits for more than a predetermined period, typically a few hundred milli-seconds, depending on the utility that is receiving the output power. For shorter disturbances or outages, up to the time limit allowed by the utility, it is important for the generator to continue working during the disturbance.

SUMMARY

The present invention in its preferred form as described below seeks to address such problem by enabling a turbogenerator system to continue to operate during disturbances of the local electrical grid for an amount of time that may be sufficient to ride through these relatively short grid disturbances.

More particularly, the invention in its preferred form provides a means for controlling a turbogenerator during a period when the electrical grid is affected by disturbances.

However, the invention is also applicable more generally in other circumstances when the speed of the turbogenerator cannot be controlled by exporting power. One such circumstance might be that the turbogenerator temporarily generates more power than a power electronics circuit is able to export. Another such circumstance might be that the power electronics circuit develops a temporary fault or overheats and is therefore temporarily unable to export power. Yet another such circumstance might be where the turbogenerator is being used to power a local load (for example an electrical machine, heater, battery charger or localised power distribution system), and that local load is unable to provide a sufficient load on the power electronics circuit to dissipate the power generated by the turbogenerator.

According to an aspect of the invention, there is provided an apparatus for controlling a turbogenerator system when a power electronics circuit of the turbogenerator system is unable to provide a sufficient load on the turbogenerator to prevent the turbogenerator from accelerating uncontrollably, comprising: a monitor including a first sensing device operable to detect a condition of the turbogenerator, and a brake controller responsive to a turbogenerator detection output from the first sensing device to issue a first brake control signal for operating a brake circuit to prevent the turbogenerator from accelerating uncontrollably and a second brake control signal for operating the brake circuit to permit resumption of normal operation of the turbogenerator. Preferably, the power electronics circuit is deactivated during a grid disturbance, and the apparatus comprises a second sensing device operable to detect a condition of the grid, and a trigger circuit responsive to a grid detection output from the second sensing device indicating a cessation of the grid disturbance to reactivate the power electronics unit and begin exporting power to the grid.

According to one embodiment, apparatus for controlling a turbogenerator system during a grid disturbance comprises: a monitor including a first sensing device operable in response to a grid disturbance to detect a condition of the turbogenerator and a second sensing device operable in response to a grid disturbance to detect a condition of the grid, a brake controller responsive to an output from the first sensing device to issue a first brake control signal for switching on a brake to prevent the turbogenerator from accelerating uncontrollably and a second brake control signal for switching off the brake to permit resumption of normal operation of the turbogenerator, and a trigger circuit responsive to an output from the second sensing device indicating a cessation of the grid disturbance to activate a convertor circuit for generating an AC output and a contactor circuit for supplying a power output in order to re-synchronise with the grid and begin exporting power to the grid so that the turbogenerator speed is controlled in the normal way.

According to another embodiment, a method for controlling a turbogenerator system during a grid disturbance comprises: in response to a grid disturbance detecting a condition of the turbogenerator employing a first sensing device and detecting a condition of the grid employing a second sensing device, responsive to an output from the first sensing device issuing a first brake control signal for switching on a brake to prevent the turbogenerator from accelerating uncontrollably and a second brake control signal for switching off the brake to permit resumption of normal operation of the turbogenerator, and responsive to an output from the second sensing device which indicates a cessation of the grid disturbance activating a convertor circuit for generating an AC output and a contactor circuit for supplying a power output in order to re-synchronise with the grid and begin exporting power to the grid so that the turbogenerator speed is controlled in the normal way.

BRIEF DESCRIPTION OF THE DRAWINGS

The invention will be described further, by way of example, with reference to the accompanying drawings in which.

DETAILED DESCRIPTION

Figure 1:
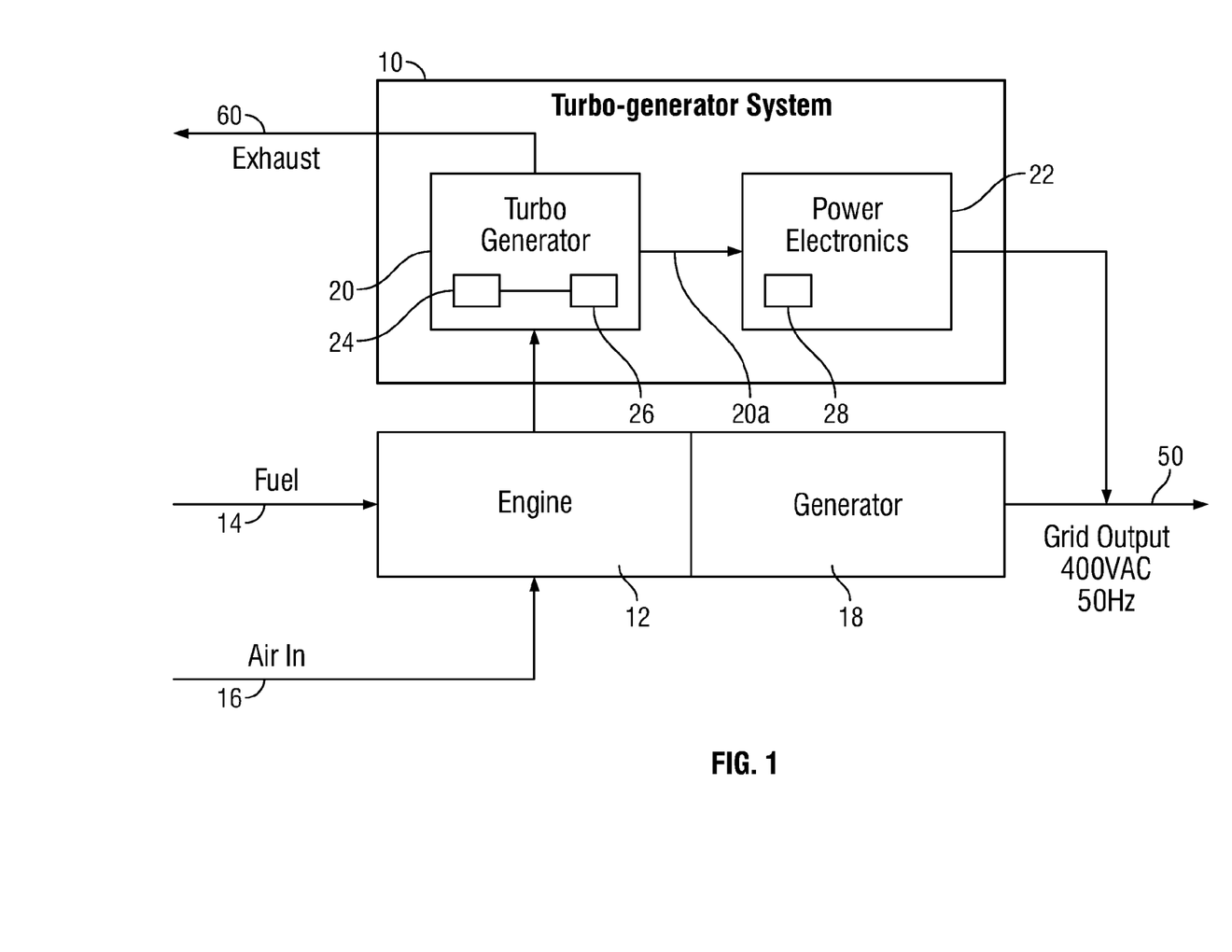
FIG. 1 is a schematic diagram of a turbogenerator system incorporating the invention.

Referring to the drawings, FIG. 1 shows a turbogenerator system 10 adapted to be fitted to a diesel engine 12, in order to improve the fuel efficiency of the diesel engine 12 by recovering waste energy from the exhaust gases of the engine. The diesel engine 12 takes in fuel and air on lines 14 and 16, respectively, and supplies power for a main generator 18, whose output is connected via an overall output line 50 to the local electrical grid network. The turbogenerator system 10 comprises a turbogenerator 20 combining a turbine 24 and a high speed electrical generator 26, wherein the turbine 24 is arranged to be driven by the exhaust gases from the engine 12. Thereafter, the exhaust gases are expelled by way of line 60. The output of the turbogenerator 20 is applied by way of a line 20a to a power electronics unit 22 for conversion into grid quality power for output. As shown in FIG. 1, the turbogenerator system 10 and the main generator 18 are effectively connected in parallel for supplying an output to the local electrical grid.

The speed of the turbogenerator 20 is controlled by adjusting the load on the high speed electrical generator 26 by means of the power electronics unit 22, which exports variable amounts of power to the local electrical grid to hold the speed of the turbogenerator 20 at a predetermined value. The power electronics unit 22 includes a speed control unit 28 able to detect a speed signal representing the speed of the turbogenerator 20 received therein and to compare the actual speed with an internally preset speed set point to produce a speed error signal. The speed control unit 28 has programmed therein a speed control algorithm, which uses the speed error signal to generate a current demand signal for controlling the speed of the turbogenerator 20. The speed control unit 28 is a conventional proportional/integral controller, which calculates a speed error, and then proportional and integral gain values, and which then applies these gain values to calculate a current demand. Since the unit is conventional, further description is not given.

Figure 2:
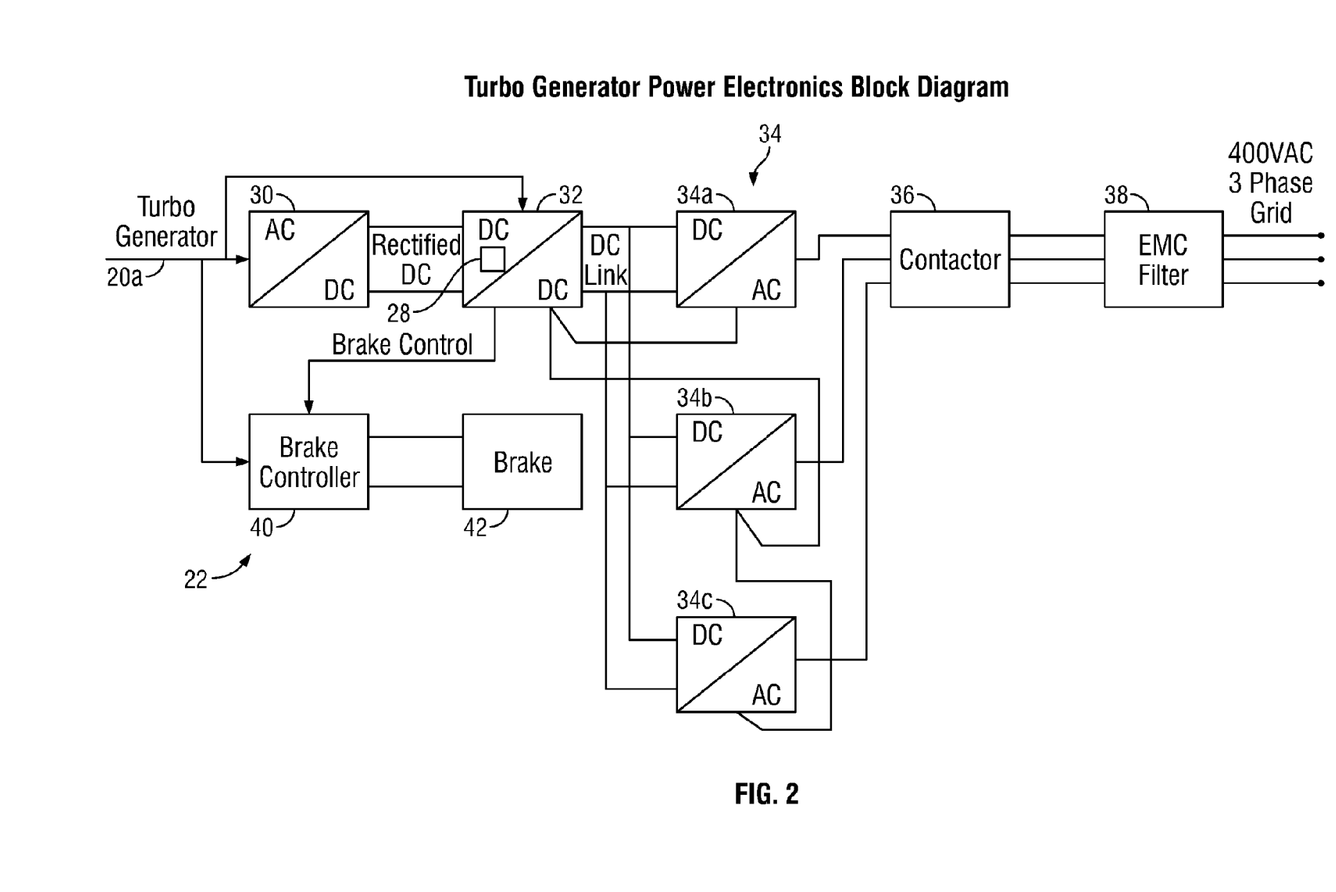
FIG. 2 is a block circuit diagram of a power electronics unit within the turbogenerator system.

Referring to FIG. 2, the power electronics unit 22 comprises an AC/DC circuit 30, which receives on input line 20a a high frequency AC input supplied from the turbogenerator 20 and rectifies the same to produce as output a DC voltage that has not had any control applied to it. Connected to the output of the AC/DC rectifier circuit 30 is a DC/DC converter 32 acting as a boost converter. The boost converter 32 receives the rectified DC voltage from the AC/DC rectifier circuit 30 as input, and produces as output a boosted and regulated DC link voltage, which is typically of the order of 700 volts. For this purpose, the boost converter 32 conventionally comprises an inductor and an IGBT switch (not shown).

The DC link voltage is applied to a PWM inverter, comprising a converter circuit 34 and a contactor circuit 36, which produces a three-phase AC output for supply to the local electrical grid. Typically, the converter circuit 34 comprises three parallel DC/AC converters 34a, 34b, 34c, each programmed to produce a sine wave output. The converters 34 provide three switching channels connected across the voltage bus and each including an upper and a lower switching device in the form of an IGBT switch and an anti-parallel diode (not shown). The output voltages generated by the converters 34 generally contain a large content of high-frequency ripple associated with the switching action of the IGBT switches in the converters 34. Therefore, an EMC or three-phase series-inductance/parallel-capacitance (L-C) output filter 38 is connected to the output of the contactor 36 to remove the majority of the high-frequency ripple.

In addition, the boost converter 32 includes the speed control unit 28, and the current demand signal from the speed control unit 28 is passed to the converters 34a, 34b, 24c of the PWM inverter 34, 36, which is set up to act as a current source, for controlling the speed of the turbogenerator 20.

According to the invention, a braking arrangement is provided for the high speed electrical generator 26 of the turbogenerator 20. The braking arrangement comprises a brake controller 40 connected to a brake circuit 42, shown in greater detail in FIGS. 3 and 4. As shown, the brake controller 40 comprises a rectifier circuit 44, which receives the AC output from the turbogenerator 20 and rectifies and supplies such output by way of a solid state switch 46, such as an IGBT, to the brake circuit 42. The switch 46 is under the control of a monitor circuit 48 included in the DC/DC converter 32 and serves to switch the brake circuit 42 in and out of operation for the purpose of controlling the speed of the high speed electrical generator 26, as explained below.

Figure 4:
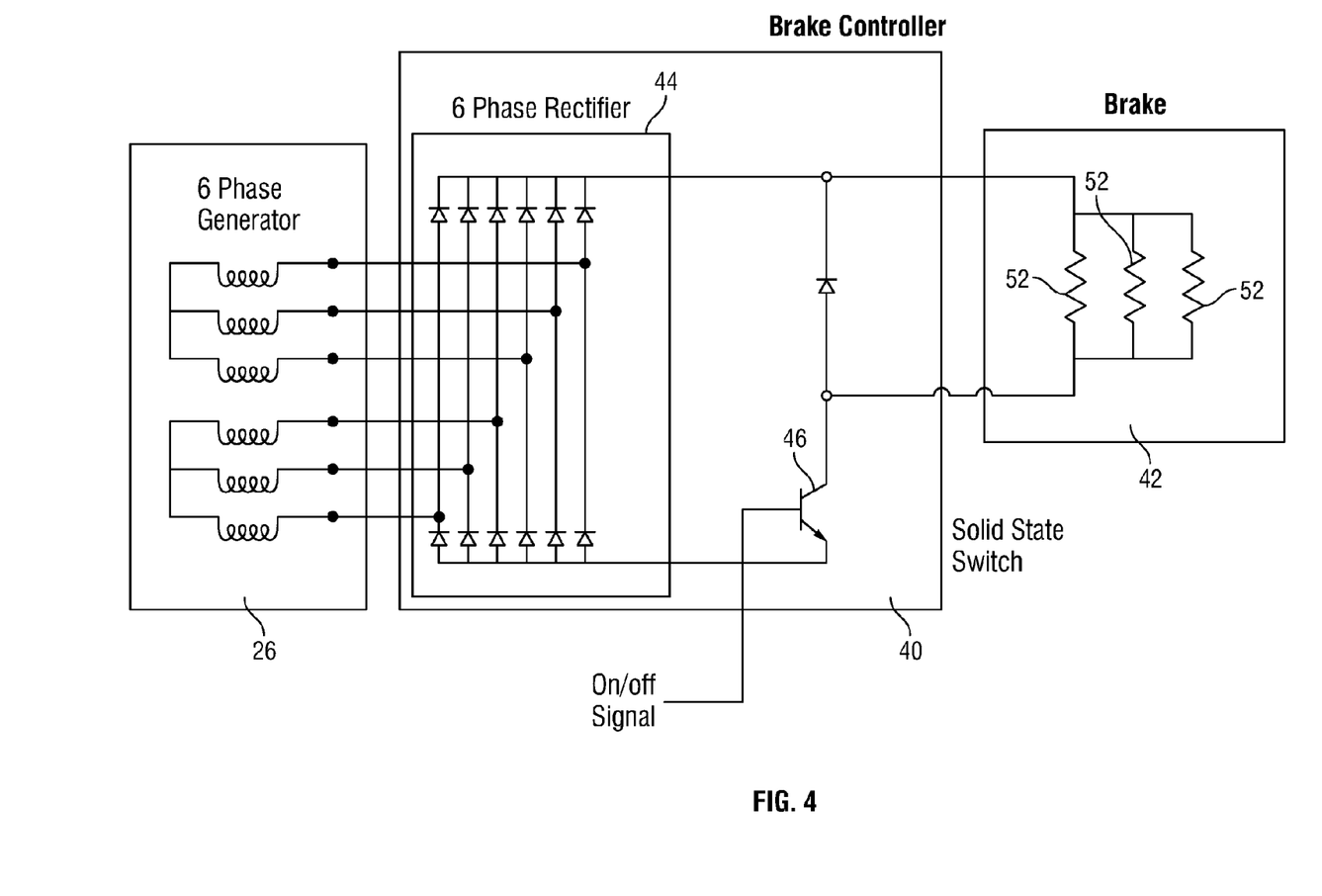
FIG. 4 is a circuit diagram showing details of the braking arrangement for the turbogenerator according to the present invention.

Referring to FIG. 4, the high speed electrical generator 26 of the turbogenerator 20 is shown as a six-phase generator supplying an output to the rectifier circuit 44, shown as a six-phase rectifier. The braking arrangement comprises a parallel connection of three resistors 52, which can be switched in and out of connection with the generator 26 under the control of the IGBT switch 46 to apply a load to, or remove the same from, the generator 26 for respectively braking the turbogenerator 20 or allowing it to accelerate. The ohmic value of the resistors is fixed at the time the system is manufactured, dependent on the application. The value is preferably selected to limit the voltage to about 800V at the maximum expected power, but anywhere between 750V and 850V would also be feasible.

Figure 3:
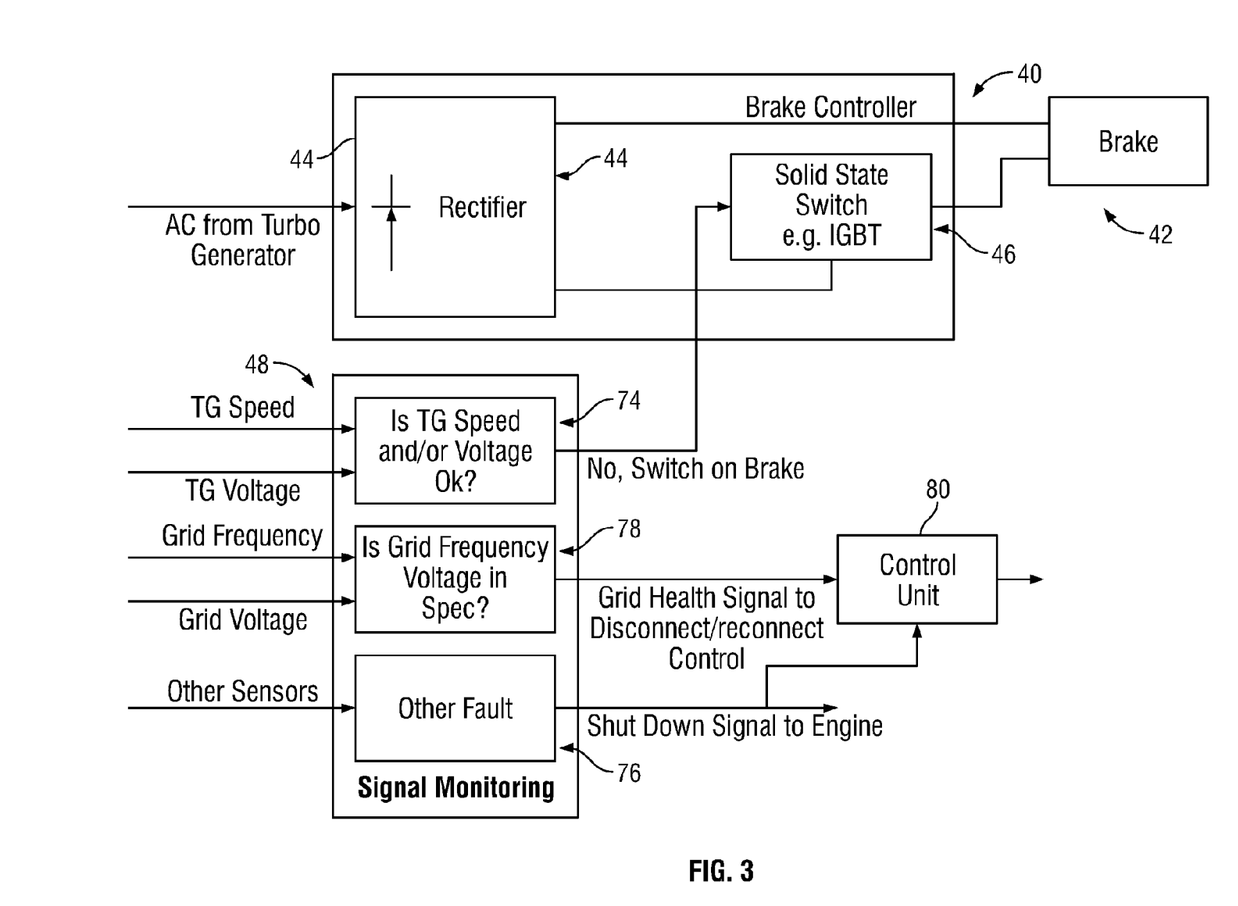
FIG. 3 is a schematic diagram of a braking arrangement and a monitoring and control system within the turbogenerator system.

The monitor circuit 48 is provided for controlling the operation of the switch 46, as shown in FIG. 3.

In normal operation of the generator 26, the switch 46 is maintained in the open state and power is supplied to the turbogenerator 20 from the power electronics unit 22 of FIG. 1. However, when an event occurs necessitating braking of the turbogenerator 20, the switch 46 is activated in order to connect the resistors 52 to apply a load to the generator 26 and brake the turbogenerator 20.

The monitor circuit 48 comprises a turbogenerator detector 74 arranged to monitor the state of the turbogenerator 20. The turbogenerator detector 74 includes the speed control unit 28 and based on a simple algorithm in the speed control unit 28 is responsive to the outputs from a pair of sensors respectively (not shown) for detecting by means of the speed control unit 28 the speed of the turbogenerator 20 and the voltage output by the turbogenerator 20, and thence for generating detection signals accordingly. In the event that the turbogenerator 20 is operating normally, these sensors will each generate a "normal operation" signal for supply to the turbogenerator detector 74, and the turbogenerator detector 74 will output a "high" signal to maintain the switch 46 in an open condition. On the other hand, if one of the sensors detects an abnormal state in the turbogenerator 20, for example that the speed or voltage output exceed a predetermined threshold, such sensor will provide an "abnormal operation" signal to the turbogenerator detector 74, which will in turn output a "low" signal that will close the switch 46. As a result, the resistors 52 will be brought into circuit to apply a load to the generator 26 and brake the same.

The monitor circuit 48 further includes a fault detector 76 arranged to detect predetermined internal or external events that will affect the operation of the turbogenerator 20 and to issue a signal to shut down the engine 12 in response to such events. For this purpose, the fault detector 76 is responsive to a series of sensors (not shown) for detecting such events. For example, one of these sensors may be arranged to detect failures in the electrical supply. Alternatively, or in addition, one of the sensors might be a pressure transmitting device arranged to detect impending engine compressor surge, or an accelerometer arranged to detect excessive vibration. Other possibilities for the sensors include sensors for the detection of internal currents or voltages of the turbogenerator system, the detection of the temperature of a heat sink of the turbogenerator, the detection of software errors, the detection of loss of communications between the various circuit elements 32, 34, or the detection of failure of an internal memory of the electrical processing system for the turbogenerator 20.

Usually, the sensors associated with the fault detector 76 will generate a "normal" signal, and the monitor circuit 48 will provide a "high" output signal maintaining the engine 12 in a normal operating state. However, in response to the detection of an abnormal condition, such as one of those listed above, the associated sensor will generate a corresponding "abnormal" signal, and the fault detector 76 of the monitor circuit 48 will in turn will issue a "low" output signal for triggering a set of events to shut down the engine 12.

Thus, as described with reference to FIG. 3, the monitoring circuit 48 in the DC/DC converter 32 includes the turbogenerator detector 74 arranged to receive electrical signals from the associated sensors representing the turbogenerator speed and voltage respectively and to supply a brake signal as output in dependence upon the conditions. The monitoring circuit 48 also includes the fault detector 76 receiving electrical output signals from associated sensors and in response supplying as necessary an output in the form of a shutdown signal for the engine 12. Further, the monitoring system 48 includes a grid monitor 78 arranged to receive signals representing grid frequency, grid voltage and grid current, from additional sensors checking the state of the electrical grid. The grid monitor 78 is arranged to supply a disconnect control signal or a reconnect control signal in certain circumstances as described below. Such signal is supplied to a control unit 80 arranged to control the state of the converters 32, 34 and the contactor 36 in the power electronics unit 22, as described below.

Figure 5:
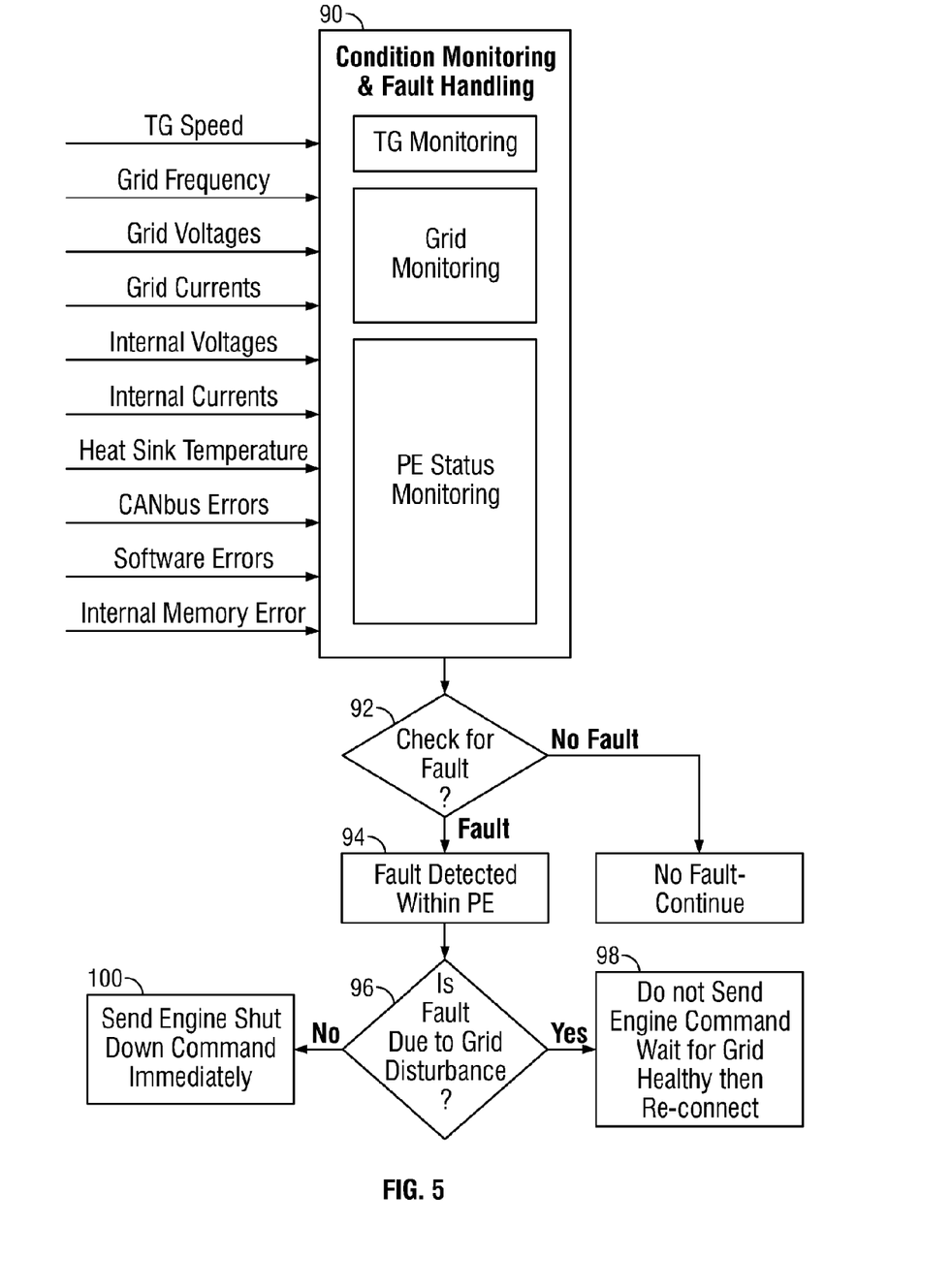
FIG. 5 is a flow chart illustrating operation of the monitoring and control system of FIG. 3.

In normal operation, all of the sensor signals are monitored by the monitoring circuit 48, as shown in step 90 in FIG. 5. An on-going process of checking for a fault takes place in step 92, and assuming that no fault has arisen, the monitoring circuit 48 does not react and normal operation of the turbogenerator system 10 continues unchecked. Only in the event that a fault arises does the system move from step 92 to step 94, which signals the initiation of the process according to the invention.

More especially, when a fault is detected within the monitoring circuit 48 in step 94, then the power electronics unit 22 inspects the outputs of all the sensors associated with the two detectors 74, 76 and the grid monitor 78 and establishes whether or not the fault is due to a grid disturbance. If the fault is due to a failure of the grid, then the grid monitor 78 issues a grid disturbance signal to the control unit 80, which responds by shutting down the power electronics unit 22 by disabling the converters 32 and 34 and temporarily placing them in a standby condition, and by opening the contactor 36. As a result, the turbogenerator 20 will no longer be loaded by the power electronics system 22 and will begin to accelerate. Accordingly, the speed of the turbogenerator 20, and the voltage output, will soon exceed a predetermined threshold, which will be detected by the associated sensors. The outputs from the sensors will be received by the turbogenerator detector 74, which will generate an output to switch on the brake 46. The monitoring system 48 will move to step 98.

On the other hand, an inspection of the sensors by the fault detector 76 may show that the fault lies elsewhere and is not due to a grid disturbance. In this instance, the monitoring system 48 moves from step 96 to step 100, and sends out a shutdown command to shut down the engine 12 immediately. This ensures that the engine is shut down as a precaution, in the event of faults, such as overheating, that may lead to internal damage and expense. The engine 12 typically has inputs that can accept signals from external devices, and one such input (not shown) is configured to accept a shutdown signal from the monitoring system 48. Receipt of this signal by the engine 12 will initiate an engine shut down sequence. The shutdown signal is also applied via the control unit 80 to the converters 32 and 34 to disable the same and shut down the power electronics unit 22, thus leading to acceleration of the turbogenerator 20. This will then be detected by the monitor circuit 74, which will operate the brake 42. At the same time, therefore, the braking arrangement for the turbogenerator 20 will be brought into action, due to acceleration of the turbogenerator 20, to stop the turbogenerator 20 as quickly as possible.

The process that is initiated with step 98 will now be described. At this point, the monitoring system 48 is monitoring the speed and voltage of the turbogenerator 20, employing the turbogenerator detector 74, as well as the frequency and voltage of the grid, employing the grid monitor 78.

Figure 6:
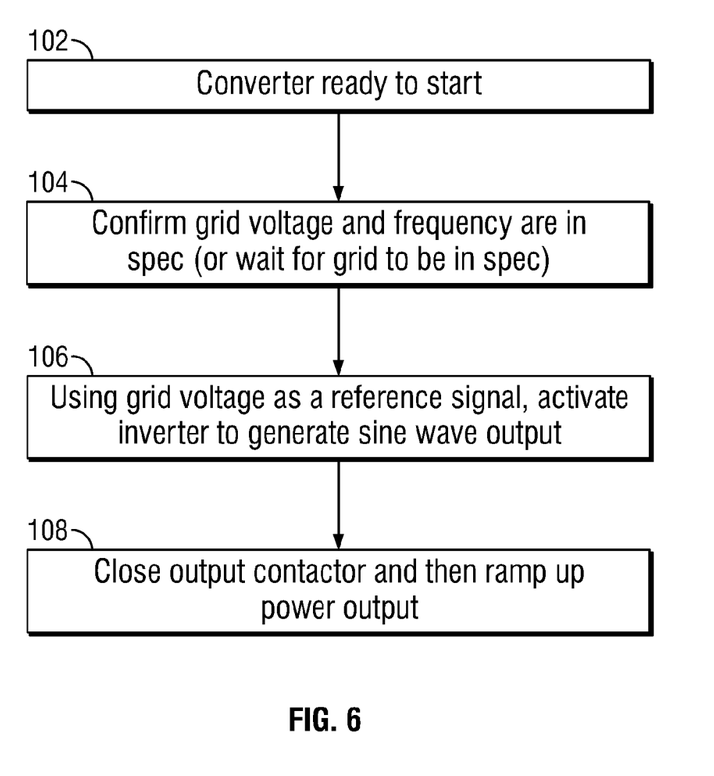
FIG. 6 is a further flow chart illustrating the operation of the system of FIG. 3.

The effect of the grid fault that has occurred is to remove the load on the turbogenerator 20, which immediately begins accelerating. As soon as the turbogenerator detector 74 detects that the speed of the turbogenerator 20 has exceeded a predetermined hysteresis threshold, or that the turbogenerator voltage output has exceeded a predetermined hysteresis threshold, the monitoring system 48 signals the brake controller 40 and activates the switch 46 to switch on the brake 42. Accordingly, the turbogenerator 20 decelerates, and its speed and voltage output drop. When these drop below further hysteresis thresholds, the monitoring system 48 again detects the situation and this time sends a signal to the brake controller 40 to switch off the switch 46 and the brake 42. The turbogenerator 20 begins accelerating again. These steps may be repeated a number of times in a cycle during the course of step 98 over a waiting period to be described below with reference to FIG. 6.

Whilst the turbogenerator speed and voltage are being monitored by the turbogenerator detector 74, the grid frequency and voltage are being monitored by the grid monitor 78, in order to detect the state of the grid and the moment when the grid disturbance ceases and the grid returns to a healthy condition. As described above the DC/DC converter circuit 32 and the DC/AC converters 34 are temporarily disabled at this time. However, during this time, the boost converter, i.e. the DC/DC circuit 32 and the DC/AC converters 34, is held in readiness to start again, as shown in step 102 in FIG. 6. When the grid monitor 78 confirms in step 104 that the grid frequency and voltage have risen to a predetermined level and are once again within the normal specification, the monitoring system 48 issues a grid healthy signal. At the same time, in step 106, the monitoring system 48 acting via the control unit 80 activates the inverter circuit, in the form of the DC/AC converters 34 and the contactor 36, employing the grid voltage as a reference signal to recommence generation of a sine wave output. Once the converters 34 are synchronised to the grid, as described above, a command is sent to close the contactor 36. The contactor 36 is thereby closed in step 108 to ramp up the power output of the power electronics unit 22 to its normal state.

Figure 7:
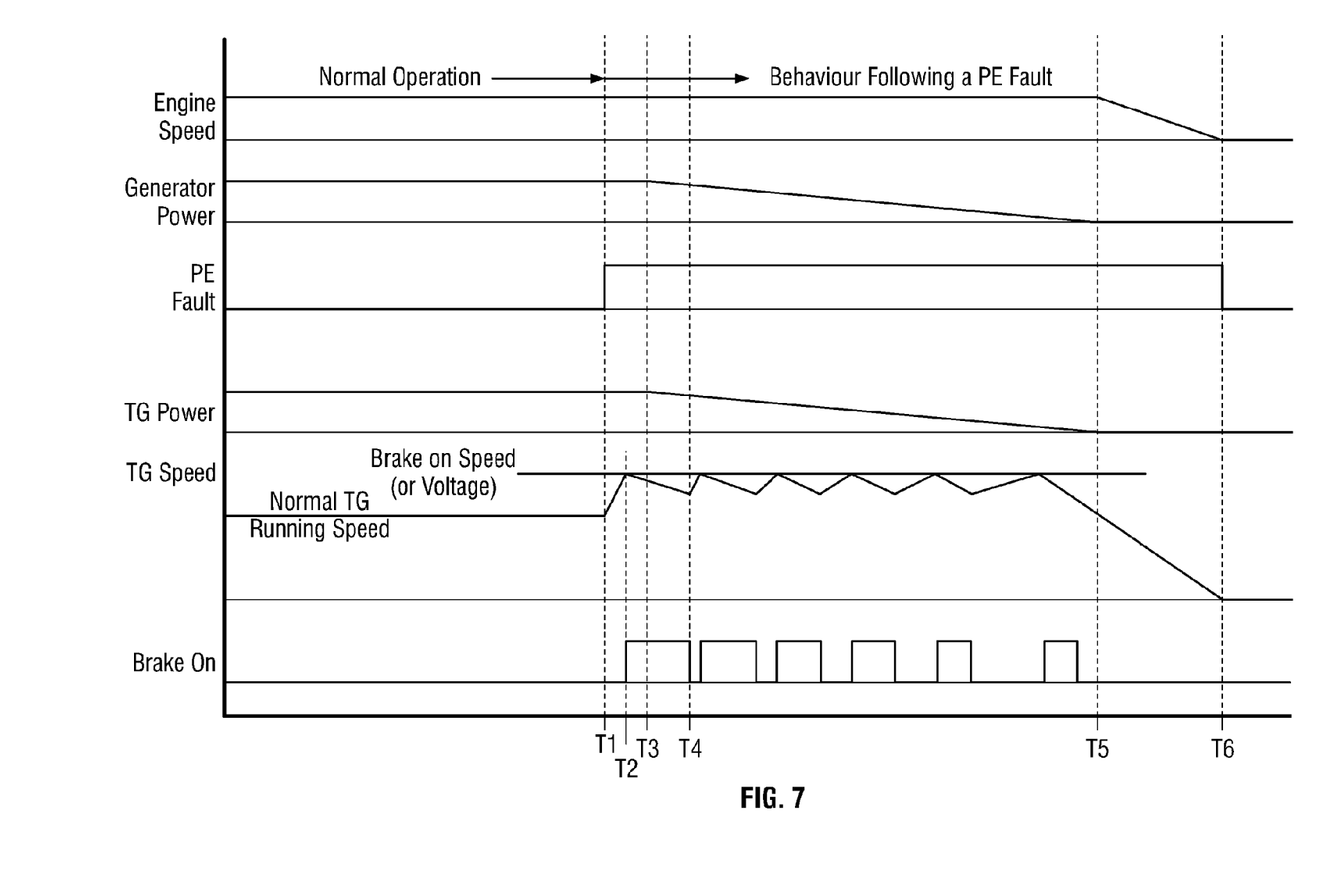
FIG. 7 is a signal diagram representing operation of a conventional turbogenerator system.
Figure 8:
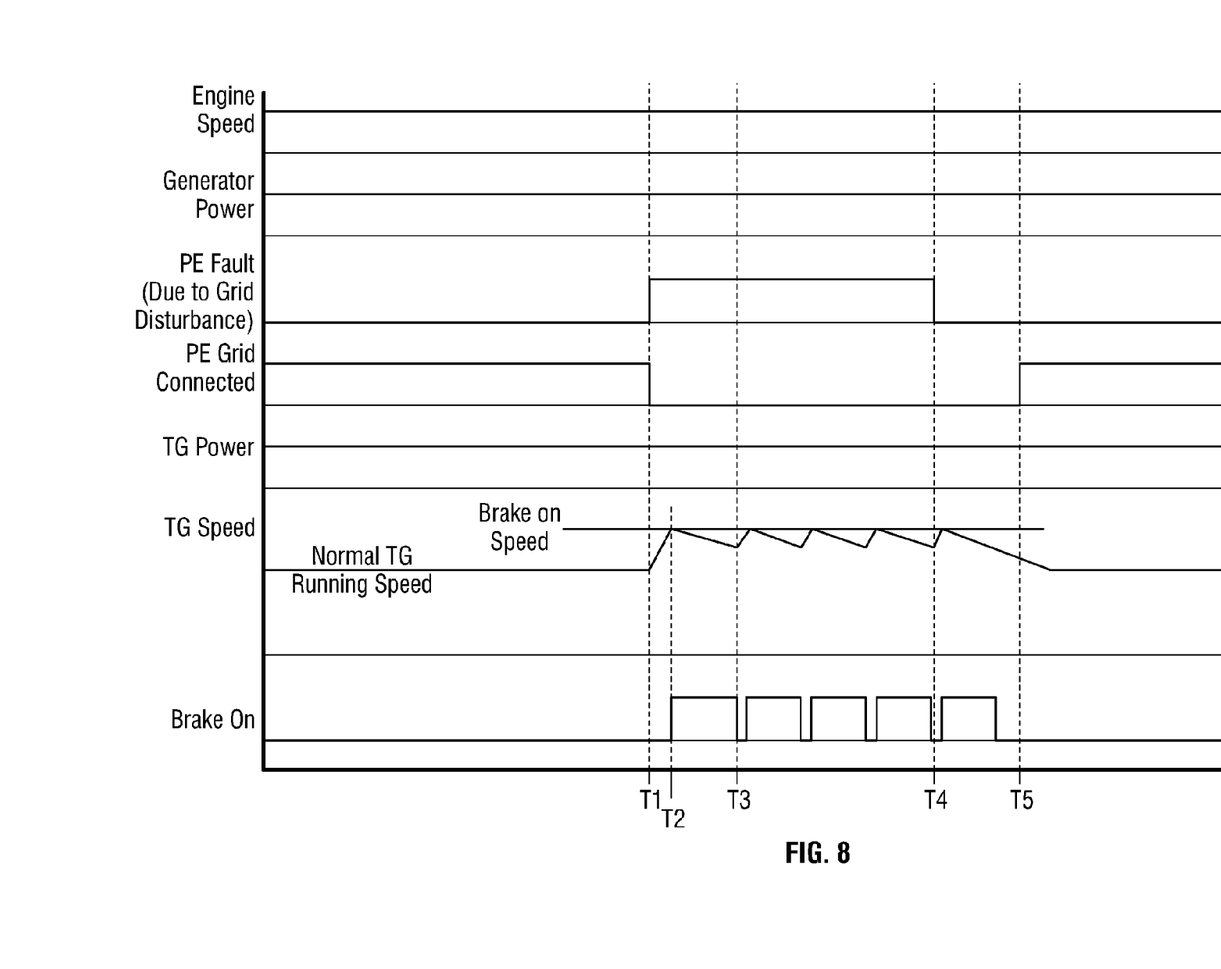
FIG. 8 is a signal diagram representing operation of a turbogenerator system according to the invention.

FIGS. 7 and 8 are signal diagrams showing the various signals output respectively in the case of the prior art and in the case of the present invention, by way of comparison. FIG. 7 pertains to the prior art, and will be described first.

As shown in the first portion of FIG. 7, during normal operation the speed of the engine 12 and the power of the generator 18 remain steady, as also does the speed of the turbogenerator 20. At time T1, a fault develops that is detected in the power electronics unit 22, so that the load on the turbogenerator 20 is removed and the turbogenerator 20 begins to accelerate. At time T2, the turbogenerator speed and voltage output both reach a respective predetermined hysteresis threshold, and the brake 46 is switched on.

Furthermore, in the conventional arrangement, responsive to the continuance of the fault for more than a brief preset period, a shutdown request is issued at time T3, causing the power output by the generator 18 to ramp down and also reducing the power to the turbogenerator 20. At time T4, the speed of the turbogenerator 20, and likewise its voltage output, drops below a hysteresis threshold, and this is detected by the turbogenerator detector 74. Accordingly, the brake 46 is switched off and the turbogenerator 20 begins accelerating again. This cycle of alternately switching on and off the brake 46 is repeated until time T5, when the engine 12 is no longer producing enough exhaust gas to power the turbogenerator 20. At this point, the turbogenerator 10 shuts down.

Turning now to FIG. 8, which shows the situation according to the present invention, the normal situation is the same, until time T1 when a fault is detected in the power electronics unit 22, at which point the loss of the load due to the grid is noted. The turbogenerator 20 starts to accelerate, and at time T2, the speed of the turbogenerator 20, and likewise the voltage output, exceeds a predetermined hysteresis threshold, and the brake 46 is switched on. The cycle of switching the brake 46 on and off occurs a number of times, dependent on the speed and/or voltage output of the turbogenerator 20, as before. By contrast with the prior art, the power electronics unit 22 does not disconnect the engine 12 from the grid and takes no immediate steps to do so. At time T3, the cycle of switching the brake 46 on and off continues.

Furthermore, again by contrast with the prior art, at time T4, the monitoring system 48 notes from the grid monitor 78 that the grid disturbance has been removed and that the grid has returned to normal, thereby removing the fault detected in the power electronics unit 22. The monitoring system 48 then issues a grid healthy signal in order to re-activate the inverter circuit, comprising the DC/DC converters 34 and the contactor 36, to generate a sine wave output again and to close the contactor 36 to begin ramping up the power output from the turbogenerator 22, and to reconnect to the grid at time T5. The process of re-activating the inverter circuit is described above.

The above described embodiments use an electrically resistive (Ohmic) brake. Such a brake uses electrical resistance rather than mechanical friction in order to slow down the turbogenerator. As such, the brake circuit does not suffer from wear and tear in the way of the mechanical brake. Furthermore, it may be faster acting, and may allow energy to be dissipated in a more controlled manner than a mechanical brake. Nonetheless, it will be appreciated that the present invention need not be limited to an electrically resistive brake, and may instead make use of a physical brake which is responsive to the first and second brake control signals to apply and remove respectively a braking force to control the speed of the turbogenerator. Such mechanical brakes are well known, and are not described further herein.

As explained above, the present invention is applicable in any situation in which the power electronics circuit is unable to export enough power to form a sufficient load on the turbogenerator to prevent the turbogenerator from accelerating uncontrollably. The above example is that of where this is caused by a grid disturbance, which leads to the deactivation of the power electronics circuit, but the problem may arise under other circumstances as outlined previously. Where the problem is not due to a disturbance in the grid, then the power electronics circuit may not need to be deactivated, but instead may be used in combination with the brake to regulate the speed of the turbogenerator. It will be understood that the brake is activated in dependence on the condition (e.g. speed or output voltage) of the turbogenerator, which will exceed allowable bounds only in the event that the power electronics circuit is unable to regulate the turbogenerator speed unaided. There is no requirement to monitor the performance of the power electronics circuit directly. It will also be appreciated that, even where the brake is intended to regulate the turbogenerator speed in the event of a disturbance in the grid, then other techniques (i.e. in the alternative to deactivation of the power electronics circuit) could be used to isolate the power electronics circuit from the grid.

What is claimed is:

1. An apparatus for controlling a turbogenerator in a turbogenerator system when a power electronics circuit of the turbogenerator system is unable to provide a sufficient load on the turbogenerator to prevent the turbogenerator from accelerating uncontrollably, the apparatus comprising:
 a monitor comprising:
  a first sensing device configured to detect a condition of the turbogenerator and output a turbogenerator detection signal, wherein the turbogenerator is configured to recover waste energy from an engine; and
  a second sensing device configured to detect a condition of a grid and output a grid detection signal;
 a brake controller configured to:

responsive to the turbogenerator detection signal, issue a first brake control signal for operating a brake to prevent the turbogenerator from accelerating uncontrollably; and issue a second brake control signal for operating the brake to permit resumption of normal operation of the turbogenerator, and wherein the power electronics circuit is deactivated during a grid disturbance; and a trigger circuit configured to, in response to the grid detection signal from the second sensing device indicating a cessation of the grid disturbance, reactivate the power electronics unit and begin exporting power to the grid.

2. The apparatus of claim 1, wherein the brake is a physical brake responsive to the first and second brake control signals to apply and remove, respectively, a braking force to control the speed of the turbogenerator.

3. The apparatus of claim 1, wherein the brake is a brake circuit responsive to the first and second brake control signals to apply and remove, respectively, a braking force to control the speed of the turbogenerator.

4. The apparatus of claim 1, wherein the trigger circuit is configured to, in response to the grid detection signal indicating a grid disturbance, de-activate the power electronics unit.

5. The apparatus of claim 1, wherein the brake controller comprises:

a rectifier circuit arranged to rectify an AC output from the turbogenerator and to supply the rectified output to the brake circuit; and a switching device configured to issue the first and second brake control signals for controlling the supply of the rectified output to a brake circuit.

6. The apparatus of claim 1, wherein the power electronics unit comprises:

a convertor circuit configured to generate an AC output; and a contactor circuit configured to supply a power output in synchronization with the grid, wherein the trigger circuit is configured to, in response to the grid detection signal from the second sensing device indicating a cessation of the grid disturbance, activate the convertor circuit and the contactor circuit and initiate a re-synchronization with the grid.

7. The apparatus of claim 1, wherein the second sensing device is configured to monitor at least one of grid frequency, grid voltage, and grid current with respect to predetermined upper and lower thresholds for generating the grid detection signal.

8. A method for controlling a turbogenerator in a turbogenerator system when a power electronics circuit of the turbogenerator system is unable to provide a sufficient load on the turbogenerator to prevent the turbogenerator from accelerating uncontrollably, the method comprising:

detecting, by a first sensing device, a condition of the turbogenerator, outputting, by the first sensing device, a turbogenerator detection signal;

issuing, by a brake controller and in response to the turbogenerator detection signal, a first brake control signal for switching on a brake to prevent the turbogenerator from accelerating uncontrollably, wherein the power electronics circuit is deactivated during a grid disturbance;

issuing, by the brake controller, a second brake control signal for switching off the brake to permit resumption of normal operation of the turbogenerator;

detecting, by a second sensing device, a condition of a grid;

outputting, by the second sensing device, a grid detection signal;

reactivating, by a trigger circuit and in response to the grid detection signal from the second sensing device indicating a cessation of the grid disturbance, the power electronics unit and beginning exporting power to the grid.

9. The method of claim 8, wherein the brake is a physical brake responsive to the first and second brake control signals to apply and remove, respectively, a braking force to control the speed of the turbogenerator.

10. The method of claim 8, wherein the brake is a brake circuit responsive to the first and second brake control signals to apply and remove, respectively, a braking force to control the speed of the turbogenerator.

11. The method of claim 8, further comprising de-activating, by the trigger circuit, the power electronics unit in response to a further grid detection signal from the second sensing device indicating a grid disturbance.

12. The method of claim 8, wherein the brake controller comprises a rectifier circuit and a switching device, the method further comprising:

operating the brake by means of an output from the rectifier circuit, wherein the rectifier circuit is configured to rectify an AC output from the turbogenerator; and wherein the switching device is configured to issue the first and second brake control signals and control the supply of the rectified output to a brake circuit.

13. The method according to claim 8, wherein the power electronics unit comprises a convertor circuit configured to generate an AC output and a contactor circuit configured to supply a power output in synchronization with the grid, the method further comprising:

responding to the grid detection output from the second sensing device indicating a cessation of the grid disturbance by activating the convertor circuit and the contactor circuit and by initiating a re-synchronization with the grid.

14. The method according to claim 8, further comprising monitoring, by the second sensing device, at least one of grid frequency, grid voltage and grid current with respect to predetermined upper and lower thresholds for generating the grid detection output.

* * * * *